United States Patent
Messerschmid et al.

(10) Patent No.: US 7,215,237 B1
(45) Date of Patent: May 8, 2007

(54) SECURITY DEVICE FOR THE GLOBAL PROTECTION WITH OBJECTS WITH ELECTRONIC COMPONENTS

(76) Inventors: Ernst Messerschmid, Der Schöne Weg 6, D-72766 Reutlingen (DE); Felix Huber, Ganswiesenweg 26, D-70839 Gerlingen (DE); Wolfgang Schäfer, An der Lehmgrube 7, D-71254 Ditzingen (DE)

( * ) Notice: Subject to any disclaimer, the term of this patent is extended or adjusted under 35 U.S.C. 154(b) by 0 days.

(21) Appl. No.: 09/622,491

(22) PCT Filed: Feb. 19, 1999

(86) PCT No.: PCT/EP99/01082

§ 371 (c)(1),
(2), (4) Date: Sep. 5, 2000

(87) PCT Pub. No.: WO99/42344

PCT Pub. Date: Aug. 26, 1999

(30) Foreign Application Priority Data

Feb. 20, 1998 (DE) .................... 198 07 066

(51) Int. Cl.
*H04Q 1/00* (2006.01)
(52) U.S. Cl. .............. 340/5.1; 340/5.31; 340/5.64; 340/5.72; 340/426.11
(58) Field of Classification Search ........ 340/5.31, 340/426.11, 426.12
See application file for complete search history.

(56) References Cited

U.S. PATENT DOCUMENTS

| | | | | |
|---|---|---|---|---|
| 3,112,004 A | * | 11/1963 | Neaville | 180/167 |
| 4,494,114 A | * | 1/1985 | Kaish | 340/5.31 |
| 4,619,231 A | * | 10/1986 | Stolar et al. | 180/167 |
| 4,878,050 A | * | 10/1989 | Kelley | 180/167 |
| 5,229,648 A | * | 7/1993 | Sues et al. | 340/5.31 |
| 5,276,728 A | * | 1/1994 | Pagliaroli et al. | 307/10.3 |
| 5,490,200 A | | 2/1996 | Snyder et al. | |
| 5,532,690 A | * | 7/1996 | Hertel | 340/989 |
| 5,711,392 A | | 1/1998 | Büdel | |
| 5,729,192 A | * | 3/1998 | Badger | 340/426.12 |
| 5,898,783 A | * | 4/1999 | Rohrbach | 340/5.31 |
| 6,091,340 A | * | 7/2000 | Lee et al. | 340/5.6 |
| 6,219,540 B1 | * | 4/2001 | Besharat et al. | 340/10.1 |
| 6,285,860 B1 | * | 9/2001 | Szarka et al. | 340/426.12 |
| 6,392,531 B1 | * | 5/2002 | Gabbard | 340/5.31 |
| 2001/0040503 A1 | * | 11/2001 | Bishop | 340/426 |

FOREIGN PATENT DOCUMENTS

| | | |
|---|---|---|
| DE | 43 18 596 A1 | 12/1994 |
| GB | 2 254 461 A | 10/1992 |
| GB | 2 271 008 A | 3/1994 |
| WO | WO 88/09588 | 12/1988 |

* cited by examiner

Primary Examiner—Brian Zimmerman
(74) Attorney, Agent, or Firm—Morriss O'Bryant Compagni

(57) ABSTRACT

In the global protection of objects structured with electronic components, security devices, e.g., in a vehicle, become active by at least one component, and/or information within at least one component that is essential for operation of the vehicle is deactivated irreversibly and or erased, so that even a disassembly or bridging of the component concerned can achieve no effect, since acquisition of a functional replacement part is not available. The components can, for example, be placed in the motor electronics, the steering column lock, the door lock, and/or the key, and through miniaturization of the receiver, any electronic device can be protected including, among other things, radio telephones, (Euro-)checkcards and cash cards, credit cards, telephone cards, keys to electronic systems, mobile electronic devices, such as cassette recorder, CD players, clocks, computers, etc.

33 Claims, 3 Drawing Sheets

SECURITY DEVICE FOR THE GLOBAL PROTECTION WITH OBJECTS WITH ELECTRONIC COMPONENTS

CROSS-REFERENCE TO RELATED APPLICATIONS

The present application is the U.S. National phase of PCT/EP99/01082, filed Feb. 19, 1999, which claims priority to German Patent Application No. 1980766.7 filed Feb. 20, 1998.

BACKGROUND

1. Field of the Invention

This invention relates to devices and methods for protecting objects with electronic components.

2. Description of Related Art

It is known that electrical components can be controlled remotely by radio signals. A typical application is an electronic alarm system and/or drive lock of a vehicle, which the user activates or deactivates with a transmitter. In this case, it does not matter whether the transmitter radiates directly (e.g., through infrared transmission) or public radio serves or telephone networks are connected in between. However, if anti-theft protection is implemented in such a way that the object to be protected can be reactivated by disconnecting or bridging the protection device, then the protection is practically useless.

Typical characteristics and problems of such protection will be explained with the example of a vehicle. In principle, such a protection can be used for all objects with an electronic component. This can include, among other things: radio telephone ("handies"), (Euro-)Check and money cards, credit cards, telephone cards, keys for electronic lock systems, mobile electronic devices such as cassette recorders, CD players, clocks, computers, etc.

It is known that vehicles with mechanical and/or electric anti-theft protection devices can be reactivated by disassembly or bridging. This applies especially to expensive vehicles, where the entire vehicle can simply be transported by organized bands and worked on at a safe place. It is also known that vehicles with an electronic drive lock, often part of the motor control, can only be reactivated at great expense and with special knowledge. Often, reactivation is possible only with an original key and/or by involving a contract workshop.

Since with a stolen original key the vehicle can be made ready to drive immediately, a change from simple vehicle theft to theft by personal threat is being observed. Deactivation by a small hand transmitter a few hundred meters away could be conceived, but this brings the danger that the victim himself is placed in danger if the culprit becomes aware of the existence of the transmitter.

In order to make certain that the proper owner is protected, concepts have already been thought up in which the vehicle regularly receives radio signals for release of the electronics and is deactivated if these signals are absent. In a stolen vehicle, these signals can then be turned off intentionally, so that the vehicle can no longer be operated. This, however, has the disadvantage that when a radio gap appears, which is repeatedly the case with mobile telephones, further driving is no longer possible. In addition, a gapless coverage of the radio range must also be provided in other countries, since a temporary turning off of the protection during a stay abroad again makes the protection absurd. Such protection, however, means a strong restriction for legal users and therefore cannot be put on the market.

It is also known that there are devices in which a circuit in the vehicle can be activated that deactivates the ignition electronics. Such systems can be realized through a telephone connection that the user activates by dialing a particular number assigned to the vehicle receiver. Here too, global accessibility of the vehicle must be considered. These systems, however, could be circumvented by removing the receiver from the vehicle or by correspondingly shielding it from receiving signals, so that a blocking of the ignition electronics no longer occurs.

For universal protection, therefore, the system must be constructed in such a way that reactivation cannot take place through the user himself, for otherwise the information necessary for this could be obtained by force. Also, deactivation of the system must be able to take place at any time after the theft. This deactivation can also be performed by third parties, so that a threat to or even killing of the owner does not help. For a thief, therefore, stealing such an object has no value, since within a few hours it will no longer have its desired functionality.

BRIEF SUMMARY OF THE INVENTION

The present invention avoids the disadvantages mentioned above by irreversibly deactivating and/or erasing at least one of the anti-theft components, and/or information within at least one of the anti-theft components, of a stolen object that are essential for use or operation of the stolen object, such as, for example, a vehicle, mobile phone or credit card. In the case of a stolen vehicle, for example, those anti-theft components may include, for example, the motor electronics, the steering column lock, the door lock 8 and/or the ignition key.

In order to achieve worldwide protection, a radio signal may preferably be radiated by a low-orbiting satellite and/or a space station with an on-board transmitter that is capable of transmitting a signal over the face of the earth to cover the inhabited parts of the earth. If an object, such as a vehicle, is stolen, a radio signal may be transmitted from space to deactivate, for example, one or more of the anti-theft components in the vehicle. This may be accomplished, in one method, by transmitting a signal from an emergency center to the satellite to trigger the transmission of a radio signal for deactivation of the components of the vehicle.

Alternatively, the radio signal may erase indispensable important information which enables the stolen object to be used or operated. Electronic components associated with the stolen object recognize that the important information has been erased, thereby depriving the stolen object of the necessary information needed to operate properly. These and other features of the invention are described further below.

BRIEF DESCRIPTION OF THE SEVERAL VIEWS OF THE DRAWINGS

In the drawings, which illustrate what is currently considered to be the best mode for carrying out the present invention.

DETAILED DESCRIPTION OF THE INVENTION

Figure 1:
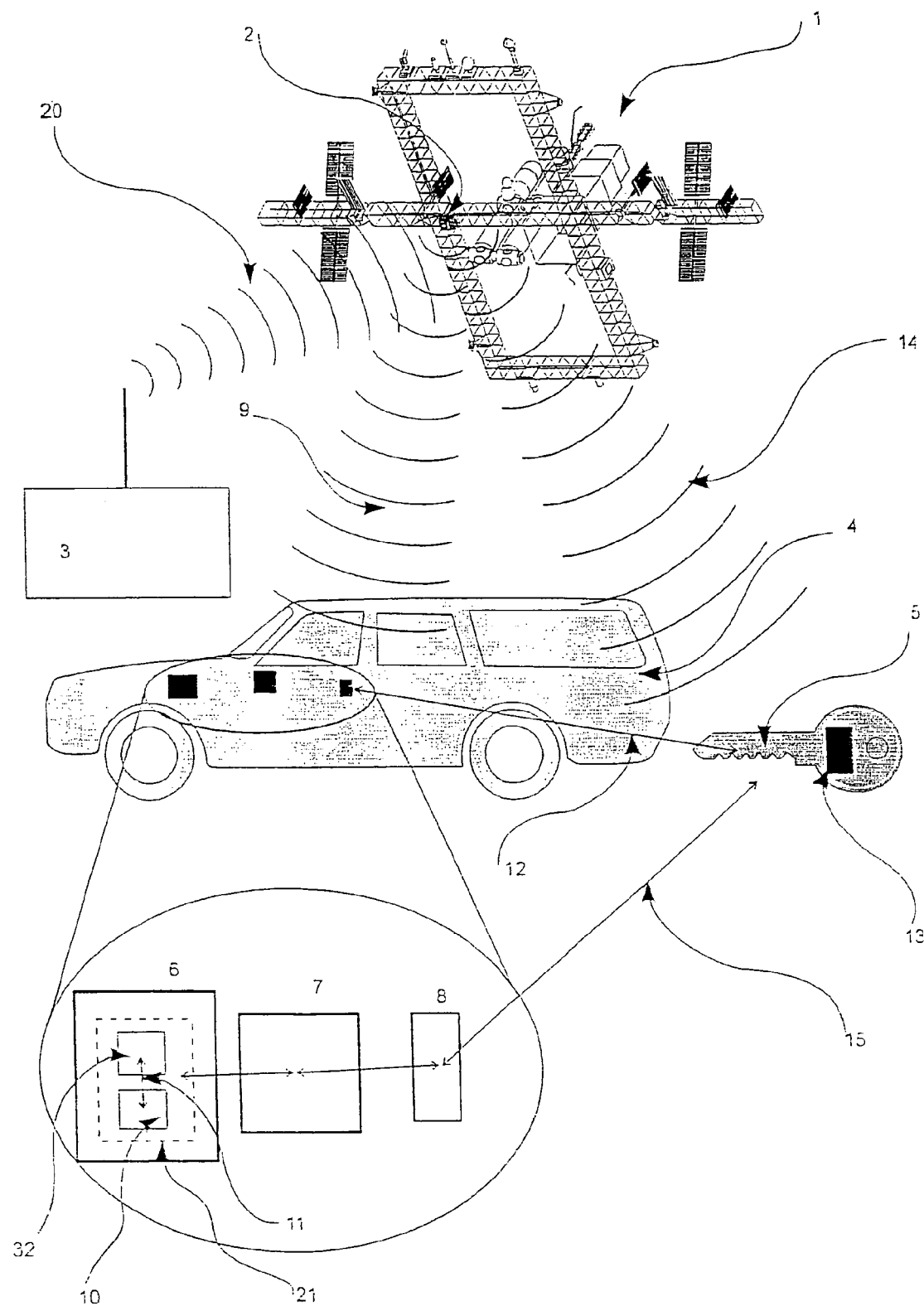
FIG. 1 is a schematic representation of the operation of the global protection device of the present invention.

The present invention, as shown in FIG. 1, avoids the disadvantages of prior devices as mentioned above by irreversibly deactivating and/or erasing at least one of the components and/or information within at least one of the components that are essential for operation of, for example, a vehicle 4, so that disassembly or bridging of the components concerned has no effect, since there is no access to the acquisition of functioning replacement parts. These components can include, e.g., the motor electronics 6, the steering column lock 7, the door lock 8, and/or the key 5.

Figure 2:
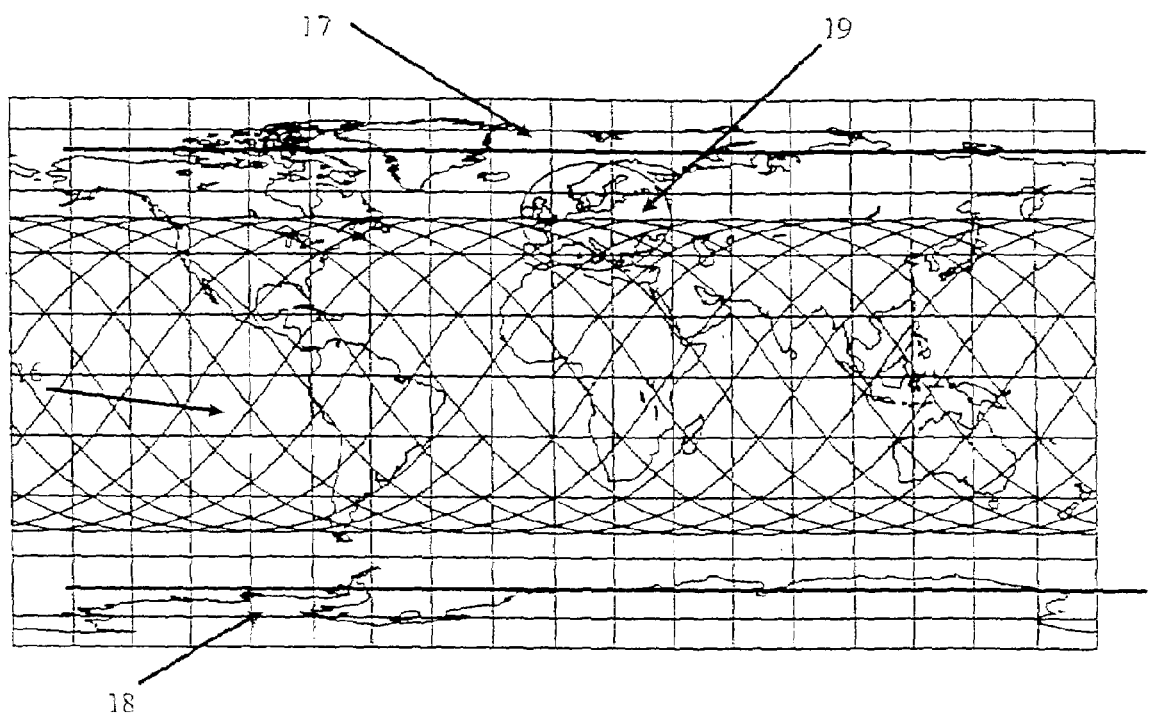
FIG. 2 is a schematic geographical representation of how the present global protection system operates around the globe.

In order to achieve worldwide protection, the radio signal 9, 14 is preferably radiated by a low-orbiting satellite and/or a space station 1, both with high inclination—in order to achieve global coverage. In this case, it is not necessary to fly in a 90° polar orbit, since the transmitter 2 has a certain side width 19 and can cover the inhabited parts of the world already with a 50° inclination because of the rotation of the earth (FIG. 2). In the non-covered regions, 17,18, at the poles, this use is of no interest, because there are no consumers there. With today's usual radio density and restrictions on transmitter power, a space station 1 comes into consideration preferably, since they can be kept at a maximum orbiting altitude of up to 400 km for a long period of time, in order to generate the required field strength. Control of the transmitter 2 can take place through radio or another communications medium, e.g., by calling an emergency center 3, which takes over the corresponding activation 20 of the transmitter 2.

In case of a theft of the vehicle 4, with a key 5 or forced taking of the key 5, the legitimate owner of the vehicle calls a service number by telephone or transmits in some other way information about the theft. After checking his authenticity, e.g., by giving a password in order to prevent malicious deactivation, the identification number of the stolen unit is sent by one or more ground stations 3 to the transmitter 2 in orbit. This identification (ID) number is preferably assigned unambiguously worldwide for every received and/or group of receivers 5,6,7,8, and it can be stored in a database, for example. The transmitter 2 now transmits this ID periodically, preferably worldwide, so that over the course of time the signal 9, 14 can be received over the entire face of the earth 16.

The theft protection within the devices, e.g., the motor electronics 6, steering column 7, or door lock 8 in the vehicle is erased when the indispensable important information in the signal 9 and/or disturbed components is/are recognized by the on-board electronics 6, the key 5, and/or the lock 8, without which operation of the vehicle is no longer possible. The receiver 32 of the decoder logic and the safety-relevant components 10 preferably form a unit 21 (e.g., microprocessor with its own internal memory) so that the data traffic 11 of the electronics is "monitored" and can possibly be manipulated, so that deactivation is no longer possible.

In addition, for deactivation the vehicle 4 can also send signals back to make localization possible more easily; this is not absolutely necessary for protection of the vehicle, however. The system can also be constructed in such a way that only the legitimate owner can trigger this signal, so that an undesired permanent localization of the vehicle is impossible.

The deactivated components can be later identified as stolen by checking the serial number and/or the disturbed data. For this, a contract workshop can use a corresponding diagnostic device, with which the data from the components 5,6,7,8 can be read. False alarms and intentional deactivations are excluded, and the signal 9, 14 can be provided with check sums to permit transmission and/or authenticity errors to be detected.

For safety reasons, in a vehicle that is moving, a regulated slow disconnection is preferably performed, so that the danger of an accident is avoided. This can occur in such a way that, for example, the vehicle can no longer be accelerated, and a stop is achieved by slowing down gradually. Then the motor can be turned off. In this case, it is irrelevant whether the deactivation takes place immediately or only after a time, after which the theft signal is turned off. For the potential thief, use of such a vehicle is uninteresting, since the vehicle can stop and become unusable after the theft.

It is also possible to place the receiver 13 not in the vehicle itself, but in the key 5 (distributed security). Modern drive locks preferably use no mechanical locks, but exchange keyed codes 12 between the key and the vehicle, which block the vehicle. In the case of a deactivation by a radio signal 9, 14, it is therefore sufficient that at least one of the components 5,6,7,8 contain the turn-off code. At the next attempt to start the vehicle 4, the information through the data exchange 15 spreads preferably through all components, which now deactivate themselves as described above.

This data exchange can likewise not be stopped, e.g., by involving synthetic information, since signaling takes place in the absence of the correct data 12. These data 12 are generated anew when any contact is made with components 5,6,7,8, and they can only be generated and decoded by them, since the components are identified with each other at the time of manufacture (one-time coding principle).

A "repair" of the vehicle is thus (preferably) possible thereafter only by exchanging all deactivated components 5,6,7,8 at the same time. A contract workshop can determine at the time the new components are sold, which naturally involves the return of at least one of the deactivated components 5,6,7,8, whether a theft signal 9, 14 was responsible for the deactivation or therefore the thief caused the vehicle 4 to stop in attempting to reactivate it. An excuse that the components were disturbed during an accident and therefore could not be presented cannot be made for the reason that an accident in which all electronic modules 6,7,8 and all keys 5 were disturbed cannot happen. Even surrendering an unauthorized key 5 that has not received a deactivation signal 14 is of no use, since in this case, the read-out of the ID and an identification with the database would immediately indicate a theft.

Distributed security also increases the reliability of the system, since vehicles are turned off under certain circumstances in areas where receiving the radio signal 9, 14 is not always possible (deep garages, etc.) or the receiver is intentionally shielded. It should not happen for the legitimate user that the device is deactivated falsely through bad reception conditions. A receiver 13 integrated into the key holder normally has good reception conditions sufficiently often and one can check regularly that the theft radio signal 14 is received without errors. If this is not the case, then the receiver in question goes into a metastable state. On the next attempt to start the vehicle, the components check with each other by a comparison 15 of their data, whether at least one of the components was able to receive a signal 9, 14 within the permitted time period. If so, then the system is reactivated completely. If not, then the user is signaled that radio contact must be made possible within a certain time period, since otherwise the electronics will be deactivated. If a thief omits this radio contact in a stolen vehicle, then the electronics are likewise deactivated, so that in this case the vehicle 4 remains useless to the thief.

Figure 3:
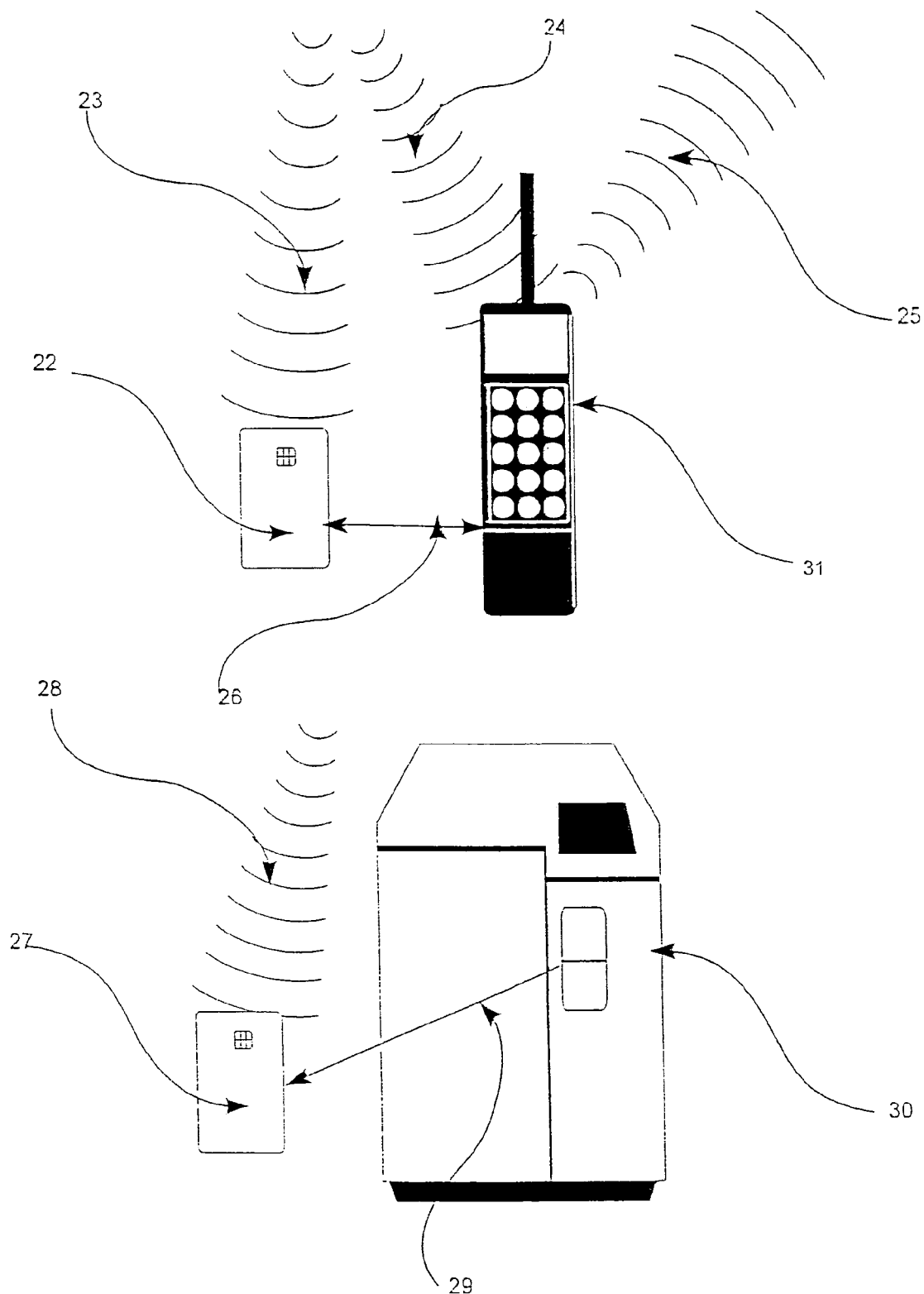
FIG. 3 is a schematic representation of operation of the present invention in other potentially stolen items, such as cell phones and credit cards.

Since a receiver can be greatly miniaturized, this system is also very well suited for devices that must make radio contact in any case, such as, e.g., radio telephones 31 (FIG. 3). The receiver in this case can be included in the chip card 22 and/or the telephone 31. If one of the devices receives a deactivation signal 23,24, at the time of the next use, when the card 22 must be inserted into the telephone 31, the chip card 22 is deactivated by the data exchange 26 between the components, whereby the telephone can still send out signals 25 even after a deactivation, so that localization is possible.

In principle, the receiver can also be built into the newest generation of check cards 27, so that here a protection of E.C. cards, credit cards, and telephone cards becomes possible. A card that receives a deactivation signal, 28, 29 (this can also derive from the automatic device 30 itself can detect and likewise erase its internal memory. At the next attempt to use the card, a money device 30 can detect this and take corresponding further steps, e.g. recording the person on video, reporting the site to the motion detector, locking the doors, etc.

What is claimed is:

1. A method for global protection of objects having electronic operating components capable of receiving a radio signal, comprising:

providing an object having a plurality of electronic operating components wherein each electronic operating component is essential for intended use or operation of the object, each electronic operating component of said plurality is structured with means for receiving a radio signal from an air-borne source of radio signal transmission for initiation of deactivation, and each said electronic operating component of said plurality comprises an anti-theft component to prevent operation of said object, each said electronic operating component being in electronic communication with one another to enable said plurality of electronic operating components to check with each other by comparison of data to determine whether at least one of said electronic operating components has received a radio signal from an air-borne source;

generating a radio signal from an air-borne source responsive to a theft event, said radio signal being generated for receipt by said plurality of electronic operating components;

receiving said radio signal by any one of said electronic operating components structured with means for receiving said radio signal from an air-borne source;

initiating irreversible deactivation of said object by at least one of said electronic operating components following receipt of said radio signal from said air-borne source; and causing alteration of at least one said electronic operating component and/or information of said at least one electronic operating component by said radio signal such that normal operation of the object is no longer possible.

2. The method according to claim 1 further comprising the intercommunication between said plurality of electronic operating components of a confirmation that a radio signal from an air-borne source has been received to initiate an irreversible deactivation of said object.

3. The method according to claim 2 wherein said plurality of electronic operating components is each capable of receiving a radio signal, and also contain, as a unit, unique identifying numbers worldwide.

4. The method according to claim 3 wherein said unique identifying numbers are transmitted once.

5. The method according to claim 3 wherein said unique identifying numbers are transmitted periodically.

6. The method according to claim 3 wherein said unique identifying numbers are held in a database.

7. The method according to claim 1 further comprising transmitting said radio signal regularly to monitor said plurality of electronic operating components and, upon failure of said radio signal to appear, generating a signal to a user to bring at least one of said plurality of electronic operating components into radio contact within a predetermined interval of time.

8. The method according to claim 1 wherein said radio signals are radiated in particular from one or more flying bodies, such as satellites.

9. The method according to claim 8 wherein said generating of said radio signal from said one or more flying bodies is effected by a transmission signal from an emergency center or another central place.

10. The method according to claim 1 wherein both the transmission of said radio signal from said air-borne source and said initiating of irreversible deactivation occur immediately.

11. The method according to claim 1 wherein both the transmission of said radio signal from said air-borne source and said initiating of irreversible deactivation occur with a time delay.

12. The method according to claim 1 wherein said at least one electronic operating component capable of receiving a radio signal also contains unique identifying numbers worldwide.

13. The method according to claim 12 wherein said unique identifying numbers are transmitted once.

14. The method according to claim 12 wherein said unique identifying numbers are transmitted periodically.

15. The method according to claim 12 wherein said unique identifying numbers are held in a database.

16. The method according to claim 1 wherein said plurality of electronic components capable of receiving a radio signal are also capable of sending signals back to said air-borne source after reception of one or more identifying numbers.

17. The method according to claim 16 wherein said signals which are sent back are also used for finding the position of said object.

18. The method according to claim 1 wherein said radio signal includes check sums which allow transmission errors and/or counterfeits to be recognized.

19. The method according to claim 1 wherein authenticity of the transmission of said radio signal to said at least one electronic operating component is secured by unique codes.

20. The method according to claim 1 wherein the effected irreversible deactivation can be checked subsequent to the object being stolen by checking data unique to the object.

21. The method according to claim 1 wherein said irreversible deactivation can be effected by a regulated slow deactivation subsequent to receipt of said radio signal.

22. The method according to claim 1 wherein activation of said object having a plurality of electronic operating components can only be effected by replacement of all said electronic operating components.

23. Apparatus for global protection of objects having electronic operating components, comprising an object having a plurality of electronic operating components, each said electronic operating component of said plurality being essential to the intended use or operation of the object and each said electronic operating component of said plurality being structured with means for receiving a radio signal from an air-borne source of radio signal transmission, and each said electronic operating component being in communication with other electronic operating components of said plurality to provide confirmation to said other electronic operating components of receipt of said radio signal from an air-borne source by at least one of said electronic operating components of said plurality to initiate irreversible deactivation of said object.

24. The apparatus of claim 23, wherein at least one of said plurality of electronic operating components contains resident information that, upon receipt of said radio signal, is disabled to provide irreversible deactivation of said object.

25. The apparatus of claim 24 wherein each said electronic operating component is structured to receive and evaluate a radio signal independently of one another.

26. The apparatus of claim 24 wherein said plurality of electronic operating components are formed as a unit interconnected electronically.

27. The apparatus of claim 24 wherein said unit of electronic operating components further includes decoder logic.

28. The apparatus of claim 24 wherein said plurality of electronic operating components is integrated in a vehicle.

29. The apparatus of claim 24 wherein said plurality of electronic operating components is integrated in a vehicle key.

30. The apparatus of claim 23 wherein said electronic operating component is integrated in a mobile telephone.

31. The apparatus of claim 23 wherein said electronic operating component is fitted in a chip card.

32. The apparatus of claim 23 wherein said electronic operating component is positioned in an electronically coded card.

33. The apparatus of claim 23 wherein said electronic operating component is positioned in a personal audio listening device.

* * * * *